(No Model.) 2 Sheets—Sheet 1.
A. BURT.
LAWN SPRINKLER.
No. 535,669. Patented Mar. 12, 1895.
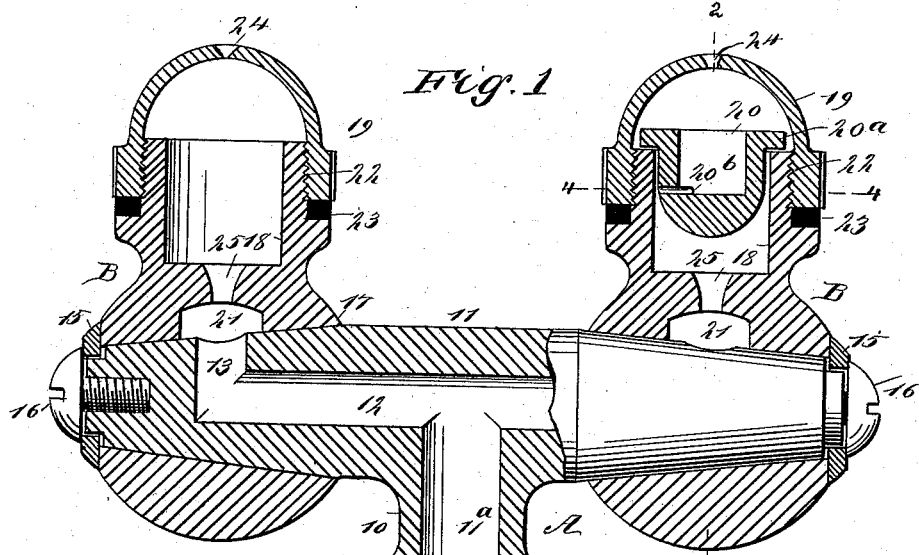
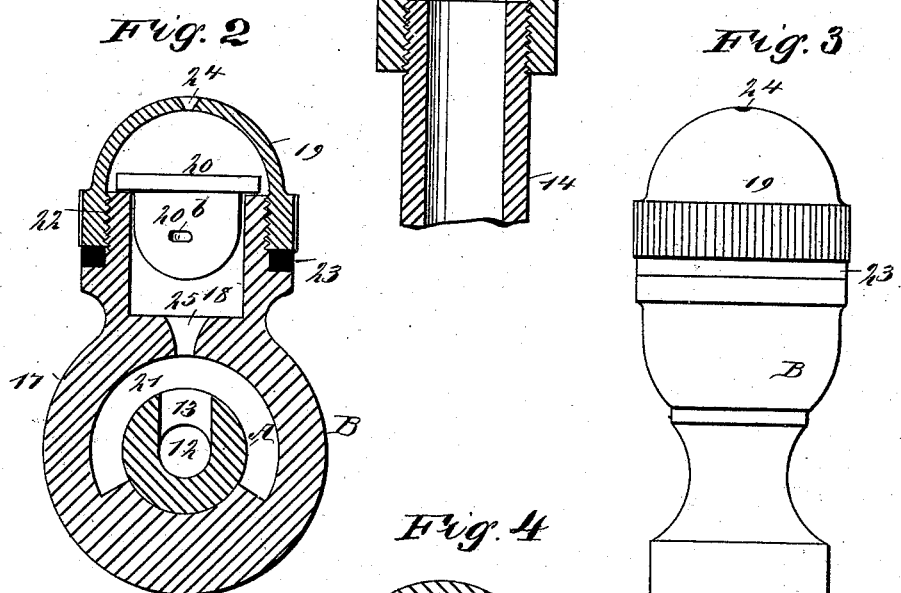
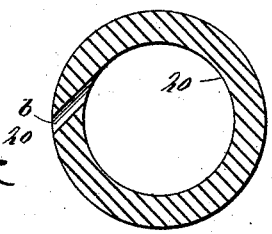
WITNESSES:
J. A. Bergstrom
C. Sedgwick
INVENTOR
A. Burt
BY Munn & Co
ATTORNEYS.

(No Model.) 2 Sheets—Sheet 2.

A. BURT.
LAWN SPRINKLER.

No. 535,669. Patented Mar. 12, 1895.

WITNESSES:
J. A. Bergstrom
C. Sedgwick

INVENTOR
A. Burt
BY
Munn & Co
ATTORNEYS.

UNITED STATES PATENT OFFICE.

ALEXANDER BURT, OF DUNEDIN, NEW ZEALAND.

LAWN-SPRINKLER.

SPECIFICATION forming part of Letters Patent No. 535,669, dated March 12, 1895.

Application filed December 1, 1893. Serial No. 492,481. (No model.) Patented in New Zealand July 1, 1892, No. 5,635; in Victoria October 6, 1892, No. 10,018, and in New South Wales November 16, 1892, No. 4,114.

*To all whom it may concern:*

Be it known that I, ALEXANDER BURT, a subject of the Queen of Great Britain, residing at Dunedin, New Zealand, have invented a new and Improved Lawn-Sprinkler, (for which I have obtained Letters Patent in New Zealand, No. 5,635, dated July 1, 1892; in New South Wales, No. 4,114, dated November 16, 1892, and in Victoria, No. 10,018, dated October 6, 1892,) of which the following is a full, clear, and exact description.

My invention relates to an improvement in lawn sprinklers, and it has for its object to provide a sprinkler which may be used either single or double, and which may be made to revolve if desired, and to so construct the sprinkler that the water or other fluid used may be cut off therefrom in an exceedingly simple, convenient and economic manner.

A further object of the invention is to provide a lawn sprinkler which will give a jet of a cyclonic character, or a single fine jet, and which may be used in the same manner as the plain nozzle of a hose, or be employed for spraying trees or shrubs with a chemical or other fluid.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 5:
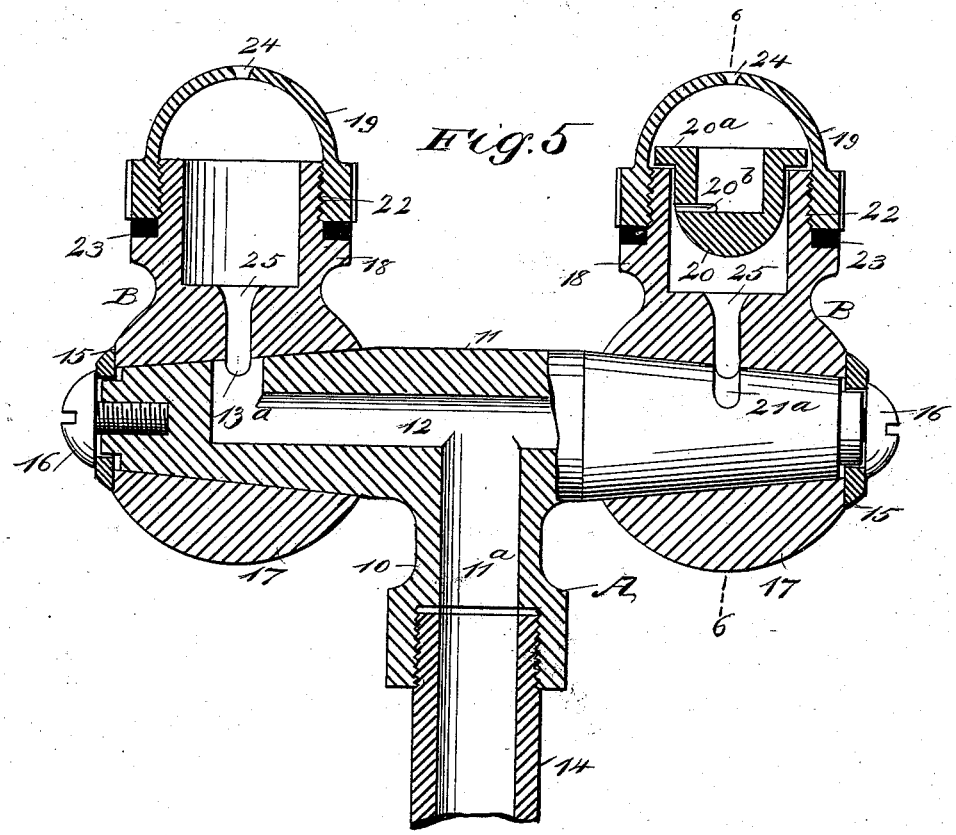
Figure 6:
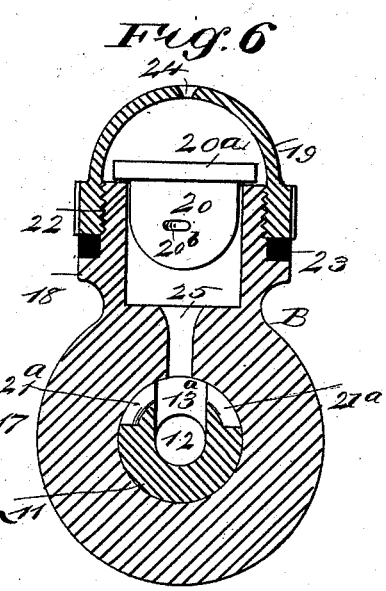

Figure 1 is a longitudinal vertical section through the sprinkler, the support being partly in side elevation and partly in section. Fig. 2 is a section taken through one of the nozzles and through the support upon which the nozzle is located, the section being taken practically on the line 2—2 of Fig. 1. Fig. 3 is a side elevation of the single sprinkler. Fig. 4 is a horizontal section through the thimble of a sprinkler, the section being taken practically on the line 4—4 of Fig. 1. Fig. 5 is a view similar to that shown in Fig. 1, illustrating a slight modification in the construction of the sprinkler; and Fig. 6 is a section taken practically on the line 6—6 of Fig. 5.

In carrying out the invention a support A is employed, which when the sprinkler is of the double type shown in Figs. 1 and 5 is of a T-shape, and the T-support embraces a shank 10 and a head 11, the head being made tapering at each side of the center to the extremities thereof. The shank is provided with a bore 11$^a$ made longitudinally in it, and the head is likewise provided with a bore 12, the bore of the head meeting the bore of the shank. The bore in the head, which is longitudinal, is provided with branches 13, at each end, which finds an exit at the top of the head near the end portions of the same. The T-support when employed is attached in any suitable or approved manner to a tube 14, preferably a rigid one.

When the T-support is employed a nozzle B is mounted to turn upon each tapering portion of the head of the support, the nozzles being held upon the said head by means of washers 15, and screws 16 engaging with the washers and entering the extremities of the head.

The nozzles B comprise essentially a body 17, a neck 18, a cap 19, and a thimble 20 located in the neck beneath the cap. The body of each nozzle is preferably made circular although it may be given any desired shape; and the said body is provided with an opening of tapering form, extending through it from one side to the other, the said opening receiving the tapering ends of the support head, and the joint between the body of the nozzle and the head of the support is so ground as to be a water-tight one.

In the construction of the sprinkler shown in Figs. 1 and 2, the nozzle is provided with a central segmental chamber 21, which chamber is preferably made of a length corresponding to about two-thirds the circumference of the body; and the chamber 21, which may be properly termed a water-way in each nozzle, is in communication with the outlet 13 of the water-way of the head of the support.

The neck is preferably made integral with the body of the nozzle, and is reduced in diameter at its outer end and provided with an exterior thread 22 and a washer 23, which rests upon the shoulder formed by the reduction of the nozzle. The cap 19, which is preferably of a hemispherical or dome shape, is screwed upon the neck to a bearing against the washer, said cap being preferably provided with an opening 24 in the central portion of its outer face.

A communication is established between the neck 18, which is hollow, and the water-way 21 of the body of the nozzle by means of a connecting passage 25, the upper end of the passage being preferably made flaring. The thimble 20, is provided with a flange 20ª at its open end, and the thimble is placed in an inverted position within the neck, the flange of the thimble resting upon the upper edge of the neck.

The body of the thimble is of less diameter than that of the interior of the neck, so that a space intervenes between the inner wall of the neck and the exterior wall of the body of the thimble. The interior of the neck is usually made circular in cross section, and the body of the thimble is of substantially corresponding shape. The body of the thimble is provided with an opening 20ᵇ, extending from its exterior to its interior, and the said opening is tangentially located, and enters the thimble preferably flush with the wall at its closed end, as shown in Figs. 1 and 5, the position of the opening being clearly indicated in Fig. 4. When the sprinkler is of a single form it is made as shown in Fig. 3, and the support A is omitted and the nozzle only is preserved, but the nozzle is provided in this instance with an opening extending up through it from its bottom and communicating with its tubular neck. In other respects this form of sprinkler is the same as that described with respect to the nozzle in the double form.

In the operation of the sprinkler, when it is desired that a cyclonic spray should be produced thereby, the water will pass up into the neck of the nozzle and will enter the thimble through its opening 20ᵇ; the thimble will remain stationary and the water will whirl or revolve in the thimble. In so doing the mass of water will be broken up between the thimble and the inner wall of the cap, and the result will be that the spray will escape through the opening 24 of the cap, which is beveled inward or V-shaped, and a misty spray falling in all directons around the nozzle will be obtained.

When it is desired to obtain a single jet only, the thimble is removed, and the water will pass out directly through the cap opening 24, and will be sprayed by reason of the peculiar shape of the opening. When a volume of water is required, such as that which is delivered from the nozzle of a hose for example, both the cap and the thimble are removed.

In the double form of the device shown in Fig. 1, the nozzles may be so mounted upon the support A that they may be turned by hand to throw the water at any desired angle to the support, or the nozzles may be secured upon the support at angles to each other, if in practice it is found desirable, and be prevented from turning, and it will be observed that the water may be cut off from any one or both of the nozzles by carrying the nozzles to a position the reverse of that shown in Fig. 1, which will bring the projecting portion of the body located between the ends of the water-way 21 over the outlets of the water-way of the support.

In the form of the device shown in Fig. 5, the water-way 21 is omitted from the body, and the passage-way 25 extends through from the chamber of the nozzle to the branch 13ª in the body or head of the support, and a diametrical chamber 21ª, is provided in the head of the support at the outlets of the water-way 12 therein, the chambers 21ª, corresponding to the chamber or water-way 21 in the body of the nozzle, and they likewise serve in the capacity of water-ways. Thus instead of the water emanating from the water-way 12 being massed in the nozzle it is massed in the head of the support. The device constructed as shown in Fig. 5 is operated in the same manner as the form of device illustrated in Fig. 1.

Having thus described my invention, I claim as new and desire to secure by Letters Patent—

1. In a lawn sprinkler, a nozzle, comprising a chambered body having an inlet opening in its bottom, an inverted thimble loosely mounted and depending into the body from the upper edge thereof, the said thimble being of less diameter than the chamber of the body and provided with a tangential opening in its lower part, and an apertured cap secured to the upper end of the body and serving to retain the thimble in the body, substantially as described.

2. In a lawn sprinkler, a nozzle comprising a chambered body having an opening in its bottom, a dome-shaped cap detachably secured to the body and provided with an exit opening, and a flanged thimble provided with a tangential opening, the thimble being supported in the body by its flange resting upon the upper edge thereof, and the body of the said thimble being of less diameter than the chamber of the body, substantially as described.

3. A lawn sprinkler, comprising a support provided with a water way and a nozzle held to revolve on said support, said nozzle, consisting of a chambered body having an inlet opening in its bottom communicating with the water way of the support, a cap on the body and provided with an exit opening, and an inverted thimble loosely mounted and depending into the body from the upper edge thereof, the body of the said thimble being of less diameter than the chamber of the body and provided with a tangential opening, in its lower part substantially as described, 4. A lawn sprinkler, the same consisting of a support, a nozzle loosely mounted upon the support, and means for tightening the nozzle upon its support, the nozzle consisting of a body and a tubular neck, the body being provided with a segmental water-way in communication with the neck, a cap removably attached to the neck and provided with an outlet opening, and an inverted thimble loosely supported upon the upper edge of the neck portion of the nozzle and depending into the same, said thimble being provided with a tangential opening extending through from the exterior to the interior, said opening being at the lower part of the thimble substantially as shown and described.

5. A lawn sprinkler, comprising a support provided with a water-way, and a nozzle mounted to revolve on the said support, said nozzle consisting of a body provided with a chamber having an opening in its bottom communicating with the water-way of the support, an inverted thimble provided with a flange resting loosely upon the upper edge of the body and with a tangential opening, in its lower part the body of the thimble being of less diameter than the chamber of the body, and depending into the same and a dome-shaped cap secured to the body and serving to retain the thimble in the body, said cap being provided in an exit opening, substantially as described.

6. In a lawn sprinkler, the combination with the body of the nozzle having a tubular neck, of a thimble having at its open end a flange resting upon the upper end of the neck and provided with a tangential opening, and an apertured cap secured upon the upper end of the neck, substantially as described.

7. In a lawn sprinkler, the combination, with a T-support, having a water-way provided with exits near opposite ends, of nozzles mounted to turn upon the head portion of the support, said nozzles comprising a body section and a tubular neck section, the body section being provided with a segmental water-way, registering with a water-way in the support and communicating with the support, a cap located upon the neck and provided with an exit opening, an inverted thimble loosely supported in the neck of the nozzle and provided with an opening extending through from its exterior to its interior, said opening being tangentially located, and means, substantially as shown and described, for tightening the nozzles upon their support, as and for the purpose set forth.

ALEXANDER BURT.

Witnesses:
WM. PINE, Jr.,
ALEXANDER T. BLYTH.